Nov. 10, 1925.
L. H. JOHNSON ET AL
1,560,789
HOSE HOLDER
Filed March 25, 1922    2 Sheets-Sheet 1
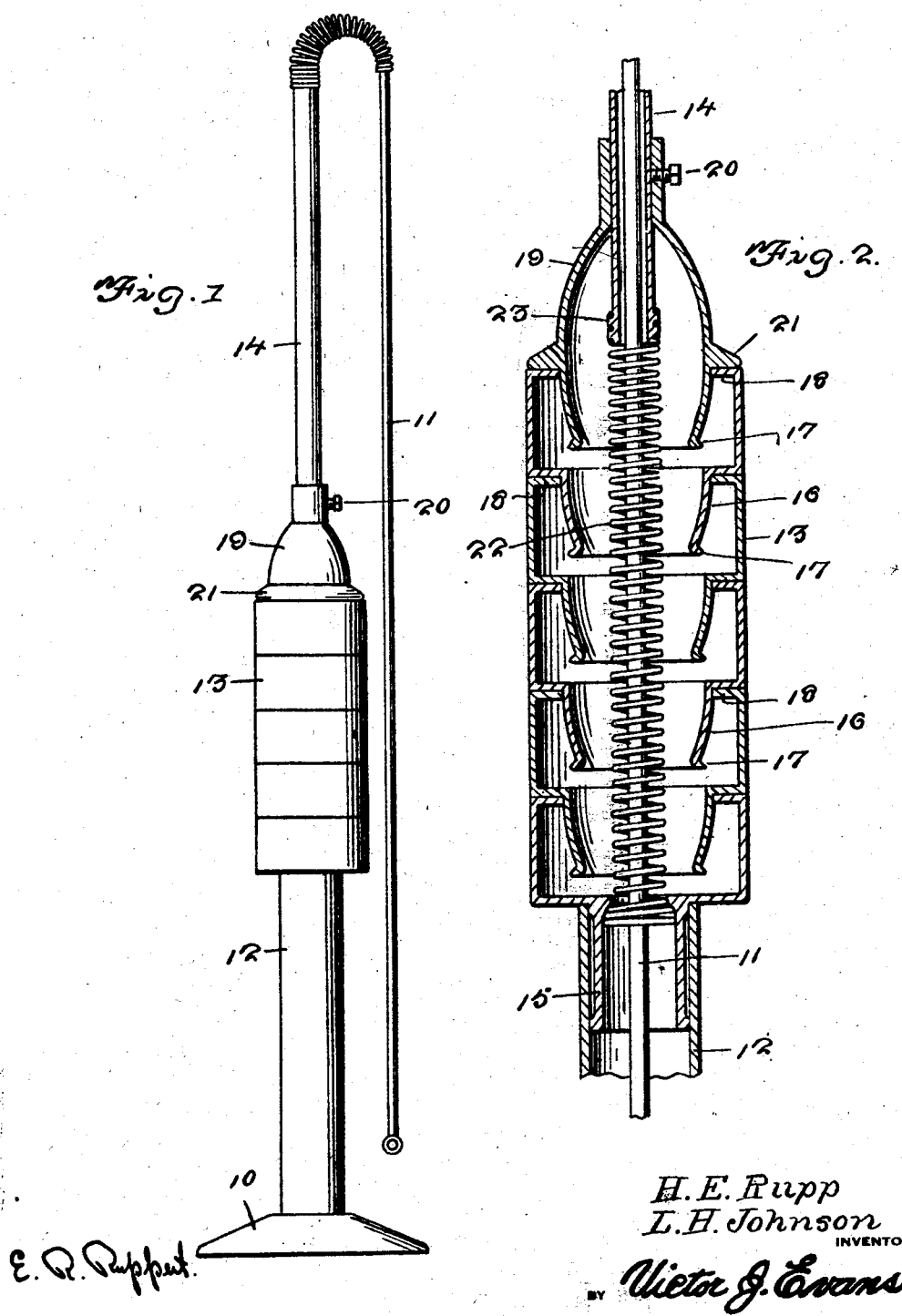

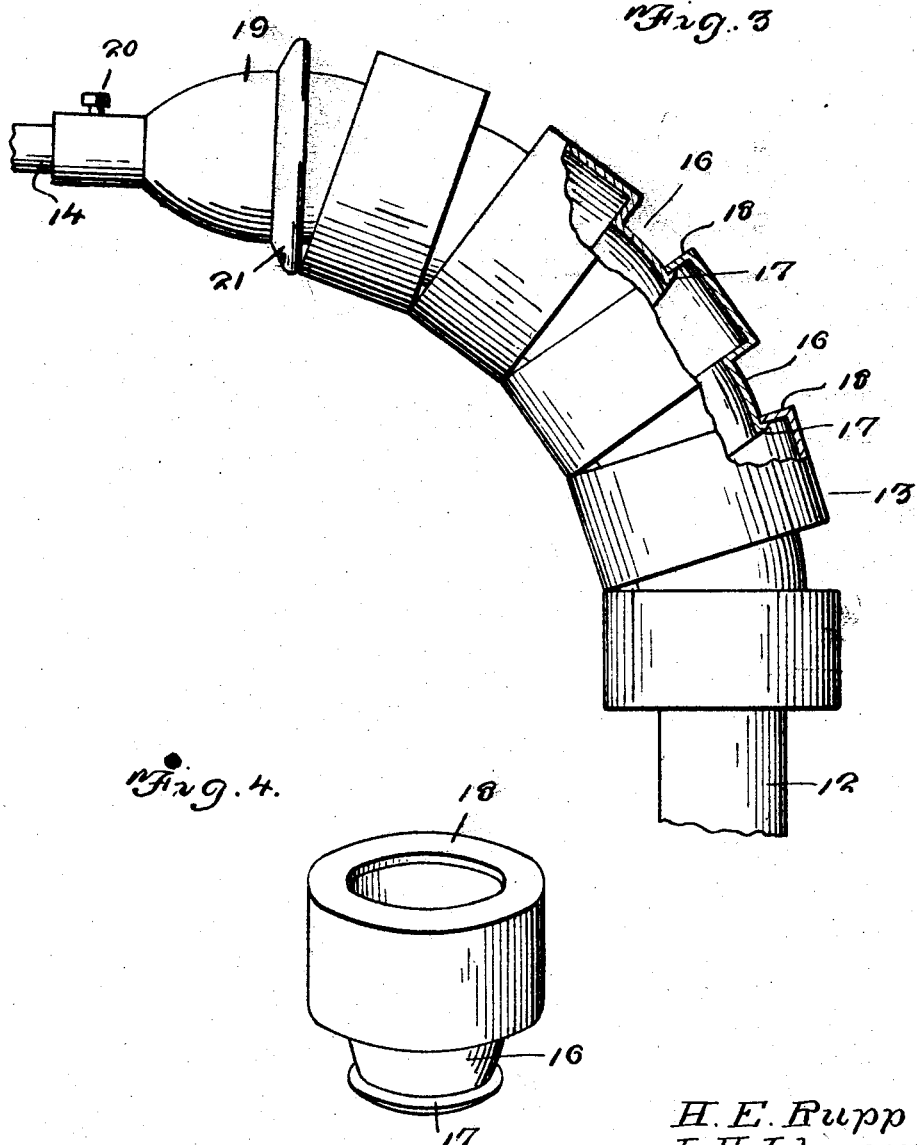

Patented Nov. 10, 1925.

1,560,789

UNITED STATES PATENT OFFICE.

LEE H. JOHNSON, OF LUVERNE, MINNESOTA, AND HERBERT E. RUPP, OF MANSFIELD, OHIO, ASSIGNORS, BY MESNE ASSIGNMENTS, TO S. F. BOWSER & COMPANY, INC., OF FORT WAYNE, INDIANA.

HOSE HOLDER.

Application filed March 25, 1922. Serial No. 546,858.

*To all whom it may concern:*

Be it known that we, LEE H. JOHNSON and HERBERT E. RUPP, citizens of the United States, residing, respectively, at Luverne, county of Rock, and State of Minnesota, and Mansfield, in the county of Richland and State of Ohio, have invented new and useful Improvements in Hose Holders, of which the following is a specification.

This invention comprehends the provision of a hose holder, which embodies amongst other features a column through which the hose is passed, the column being made of spaced sections and an intermediate flexible connecting section, the latter mentioned section being designed to provide a stop for limiting the movement of the hose in any direction.

More specifically stated, the flexible connecting section is made up of a plurality of interfitting members which are susceptible of relative sliding movement to permit of proper flexing of the section, while the members are further formed for interlocking engagement then extended and flexed, thereby limiting the movement of the hose in any direction.

A further object of the present invention is to provide a series of flat contacting surfaces or interfitting members to prevent undue swaying or vibration of the parts of the standard comprising the flexible or movable members and to provide yielding or resilient means to hold the series of interfitting members in juxtaposition to each other under tension.

In carrying out the invention, I also provide a resilient element positioned between the spaced sections of the holder, said element being tensioned when said flexible connection is bent or flexed, and operating to automatically return all of the parts including the hose to normal position when the latter is released.

The nature and advantages of the invention will be better understood when the following detailed description is read in connection with the accompanying drawings, the invention residing in the combination, construction, and arrangement of parts as claimed.

In the drawings forming part of this application, like numerals of reference indicate similar parts in the several views and wherein:

Figure 1 is a view in elevation of the device forming the subject matter of the invention.

Figure 2 is a fragmentary view on an enlarged scale showing the holder in vertical section.

Figure 3 is a view partly in section, showing the manner in which the members of the flexible connection are extended when flexed and how they are interlocked for the purpose specified.

Figure 4 is a perspective view of one of the members of the flexible connection.

Referring to the drawings in detail, 10 indicates a base which supports the column through which the hose 11 is passed in the manner illustrated in Figure 1. As shown in this particular instance, the hose 11 is an air hose, and its arrangement is such to permit of its convenient use at service stations, where such hose is used for inflating tires. The column above referred to is made up of a plurality of tubular sections, preferably three in number and indicated at 12, 13 and 14 respectively. The section 12 is associated with the base 10 in any suitable manner and is slightly larger in diameter than the section 14 which constitutes the uppermost section and is of a size slightly larger than the diameter of the hose 11. The sections 12 and 14 are united through the instrumentality of the section 13 which is of a flexible nature for a purpose to be presently described.

The section 13 is made up of a plurality of interfitting members constructed substantially cup-shaped, with open top and bottom and varying in diameter such as illustrated in Figure 4, except for the lowermost and uppermost members which are designed in a manner clearly illustrated in Figure 2. The lowermost member of this flexible section is substantially cup-shaped and is formed to provide a reduced cylindrical portion 15 of a diameter to snugly fit within the section 12. The other members of the flexible connection with the exception of the uppermost member are also substantially cup-shaped and vary from the lowermost member in that the reduced portion 16 of said members are not of uniform diameter being of substantially frusto-conical formation thereby providing external shouldered portions on the interfitting members. The reduced portion 16 of each member is received by the cup-shaped portion of the next lower member; and each reduced portion 16 terminates to provide a bead 17 which cooperates with the inturned annular flange 18 of the particular member by which it is received, to prevent casual separation of the members when the section 13 is flexed in the manner illustrated in Figure 3. The uppermost member 19 of the flexible section 13 is of substantially oval formation, terminating to provide a bead 17 which cooperates with the inturned flange 18 of the particular member by which it is received, but the upper end of the member 19 is reduced to snugly receive the section 14 of the column. The section 14 is supported by the member 19, these parts being held associated by means of a set screw 20. The member 19 is also formed with an external flange 21 which normally reposes upon the inturned flange 18 of the adjacent member. By reason of the construction just described, it is manifest that when use of the hose 11 is desired, the latter may be moved in any direction from the base 10 by reason of the flexible section 13 and when the latter is flexed as illustrated in Figure 3, the members slide one within the other until the beads 17 contact the flanges 18, thereby interlocking the members in a manner to limit the movement of the hose in the particular direction.

The spring 22 may be tensioned by loosening the set screw 20, and adjusting the uppermost section 19 of the flexible connection upon the column 14, after which these parts are held fixed relatively by tightening the set screw 20. The spring may be thus tensioned to raise various weights of hose, or the movement of any certain weight hose made more rapid.

Arranged within the section 13 and surrounding the hose 11, is a coiled spring 22. Certain convolutions of the spring at the opposed ends thereof are enlarged and closely associated to provide for a steadfast connection between the lower end of the spring and the reduced portion 15 of the adjacent member of the flexible connection, and also between the upper end of the spring and the enlargement 23 formed on the adjacent end of the section 14. Consequently, when the section 13 is flexed incident to the use of the hose, the spring 22 is tensioned, and functions to automatically return the component parts of the holder together with the hose to normal position, when the hose is released.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim is:

1. In a hose holder, a standard including a series of cup-shaped members, and means connecting said members to permit their relative tensioned movement, said cup-shaped members being each formed with an upper inwardly extending plane flange, and with an intermediate inwardly extending plane flange, the cup-shaped members being arranged in superimposed relation with the intermediate flange of one resting directly on the upper flange of the immediately underlying member, the cooperation of such flanges supporting the members in normal position.

2. In a hose holder, a standard including a series of cup-shaped members, and tensioned means connecting the members to permit their relative movement, each of said members comprising an upper section of cylindrical form with upper and lower inwardly extending flanges, and a depending rounded member arranged inwardly of the lower flange, the members being assembled with the lower flange of one resting on the upper flange of the next lower and the depending portion of one fitted within the upper flange of the next lower.

3. In a hose holder, a standard including a series of superimposed cup-shaped members, and means connecting said members to permit a relative tensioned movement thereof, each of said members having an upper cylindrical portion and a lower rounded portion, the juncture of said portions providing a flat flange, the upper edge of the cylindrical portion providing an inwardly-extending flange to provide a support for the flat flange of the superimposed member.

4. In a hose holder, a standard including a series of superimposed cup shaped members, each including an upper drum portion and a lower convex rounded reduced portion, the members being assembled with the drum portions in aligned relation and the convex rounded portion of each member fitted wholly within the drum portion of the next lower member, the meeting portions of the members being formed by flanges on the respective members which are normally in contact and freely movable relatively.

5. In a hose holder, a standard including a series of superimposed cup-shaped members, each including an upper drum portion having an upper and a lower inwardly-extending flange, and a rounded portion depending from the edge of the lower flange, the members being assembled by arranging the rounded portion of one member within the upper flange of the next lower member with the lower flange of the upper member resting squarely on the upper flange of the next lower member.

6. A flexible hose holder made up of a series of relative movable cup-shaped members, each of said members comprising an upper section of drum shape and of uniform diameter, with an upper inwardly-extending flange and a lower inwardly extending flange, and a rounded portion depending from the inner edge of said lower flange.

7. A hose holder comprising a series of super-imposed cup-shaped members each comprising an upper cylindrical portion of uniform diameter with upper and lower edge flanges, and a rounded portion of gradually decreasing diameter vertically depending from the inner edge of the lower flange, said members being assembled with the cylindrical portions in alignment with the lower flange of one resting on the upper flange of the next lower and the rounded portion of one fitting within the upper flange of the next lower, and tensioning means holding the members in aligned relation while permitting their relative movements on the flange bearings against such tensioning means.

8. A hose holder made up of a series of cup-shaped members comprising hollow bodies having upper portions of uniform diameter and lower portions of gradually decreasing diameter, the juncture of the upper and lower portions defining a flange extending inwardly of the upper portion, the upper edge of each upper portion being formed to provide an inwardly extending flange with an inner diameter corresponding to the external diameter of the lower portion of the member.

9. A hose holder made up of a series of cup-shaped members, each including an upper drum-like portion and a lower vertically rounded portion of less diameter, the juncture of the respective portions defining a flange extending inwardly of the member, the upper edge of the drum like portion having an annular flange with an internal diameter corresponding to the maximum diameter of the rounded portion, the members being assembled with the rounded portion of one fitted within the upper flange of the next lower and the respective flanges of the members in supporting contact, the free edge of the rounded portion of one member having an extension to engage the upper flange of the next lower member in the relative movements of the members to prevent their separation.

10. A hose holder made up of a series of relatively movable cup-shaped members, each comprising an upper cylindrical wall having an upper inwardly extending flange and a lower inwardly extending flange, and a depending section rounded vertically and extending from the inner edge of the lower flange, the maximum diameter of such depending section corresponding to the maximum internal diameter of the upper flange.

In testimony whereof we affix our signatures.

LEE H. JOHNSON.
HERBERT E. RUPP.